Aug. 12, 1952     C. R. PATON     2,606,625
MOTOR VEHICLE BONNET-FENDER
Filed Sept. 16, 1947     6 Sheets-Sheet 1
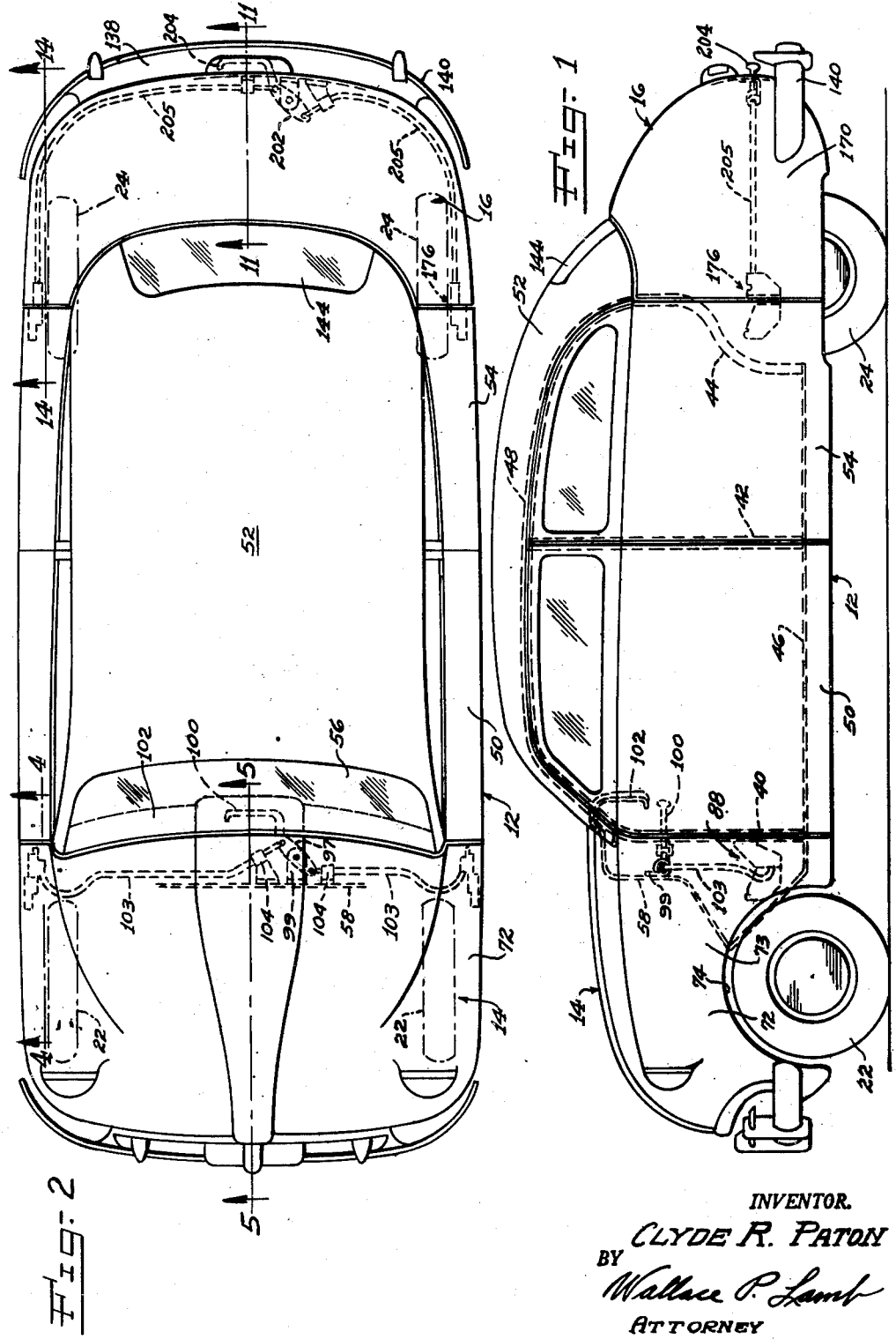
INVENTOR.
CLYDE R. PATON
BY
Wallace P. Lamb
ATTORNEY Aug. 12, 1952   C. R. PATON   2,606,625
MOTOR VEHICLE BONNET-FENDER
Filed Sept. 16, 1947   6 Sheets-Sheet 2
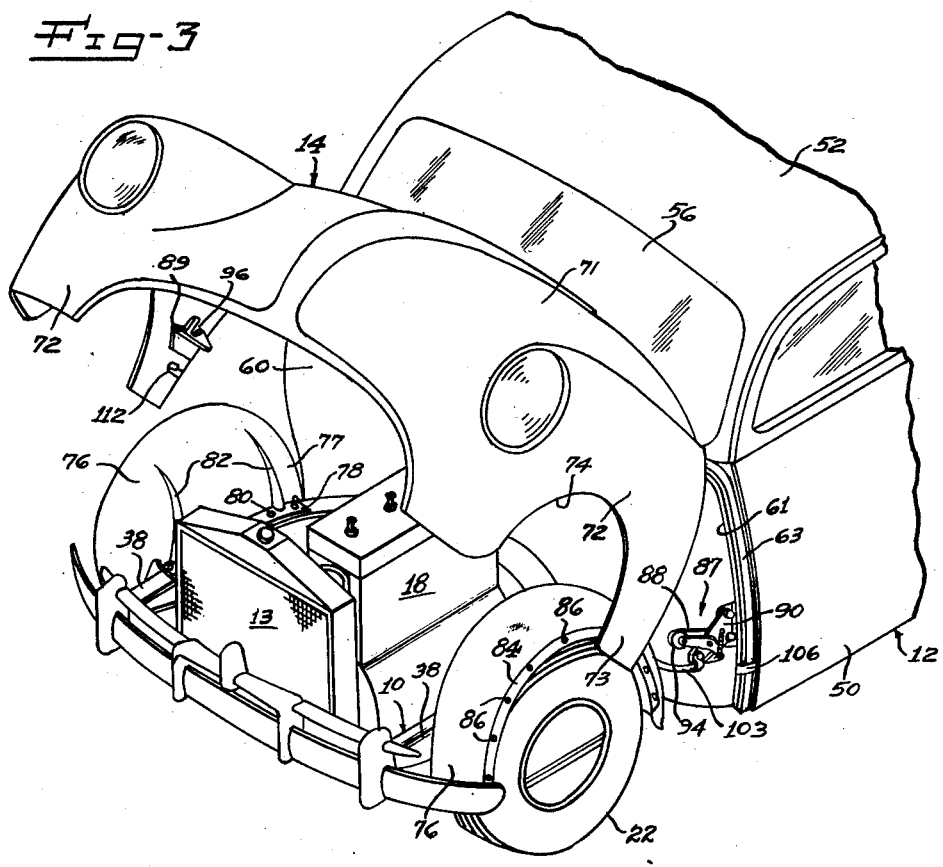
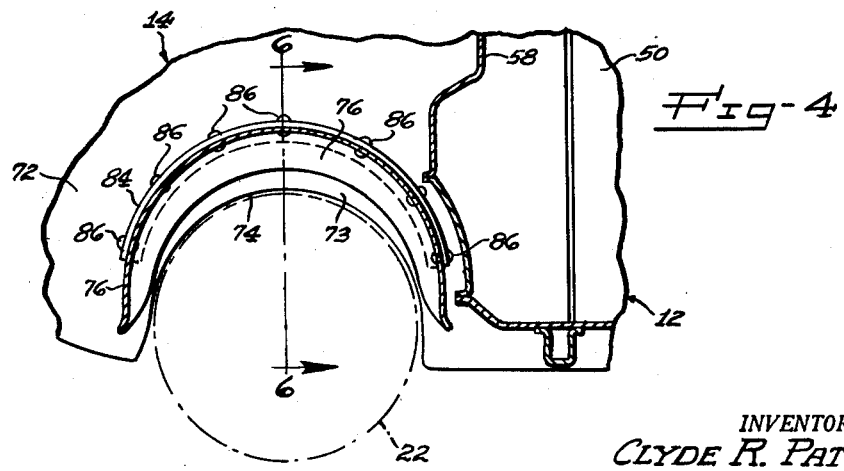
INVENTOR.
CLYDE R. PATON.
BY Wallace P. Lamb
ATTORNEY

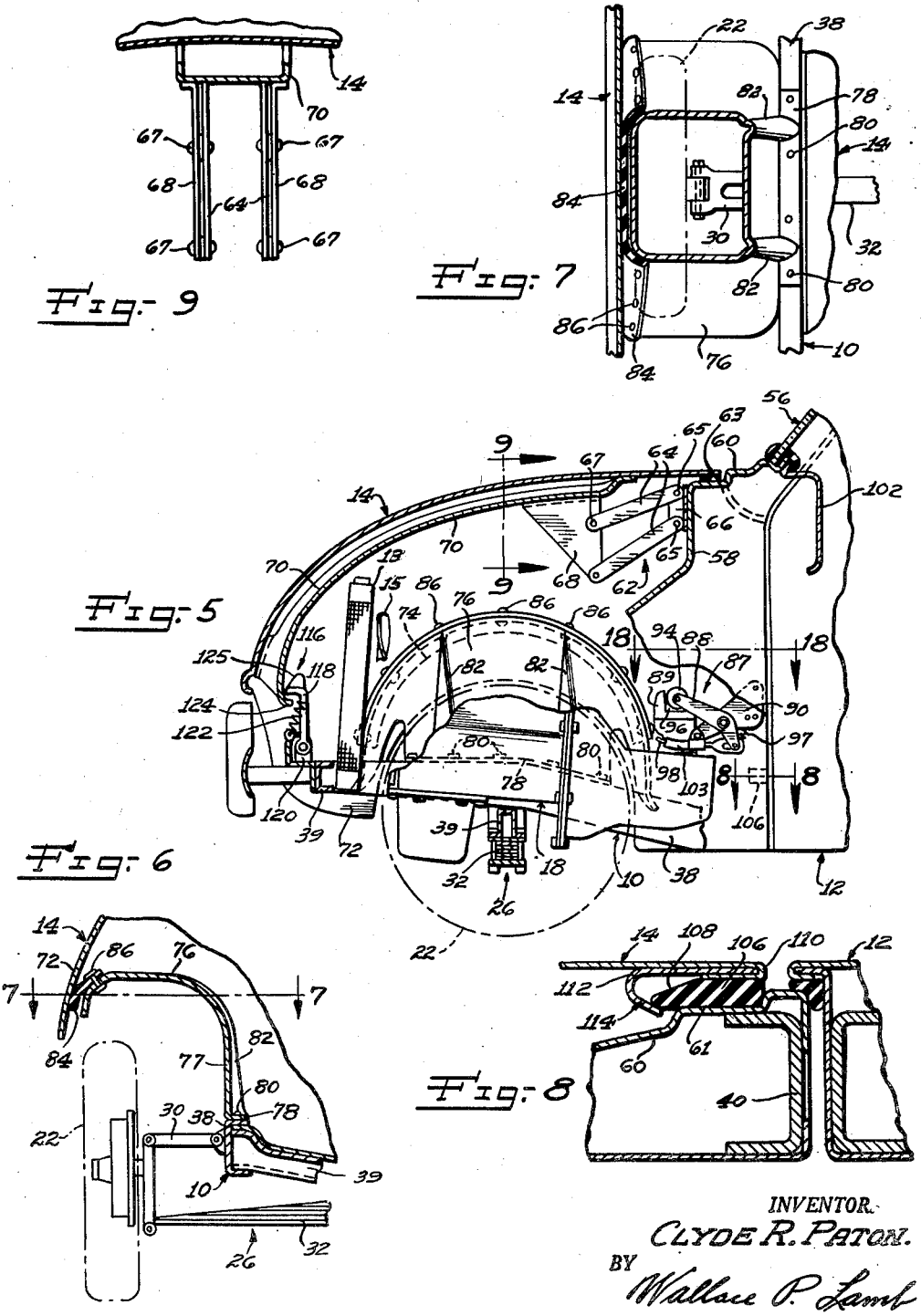

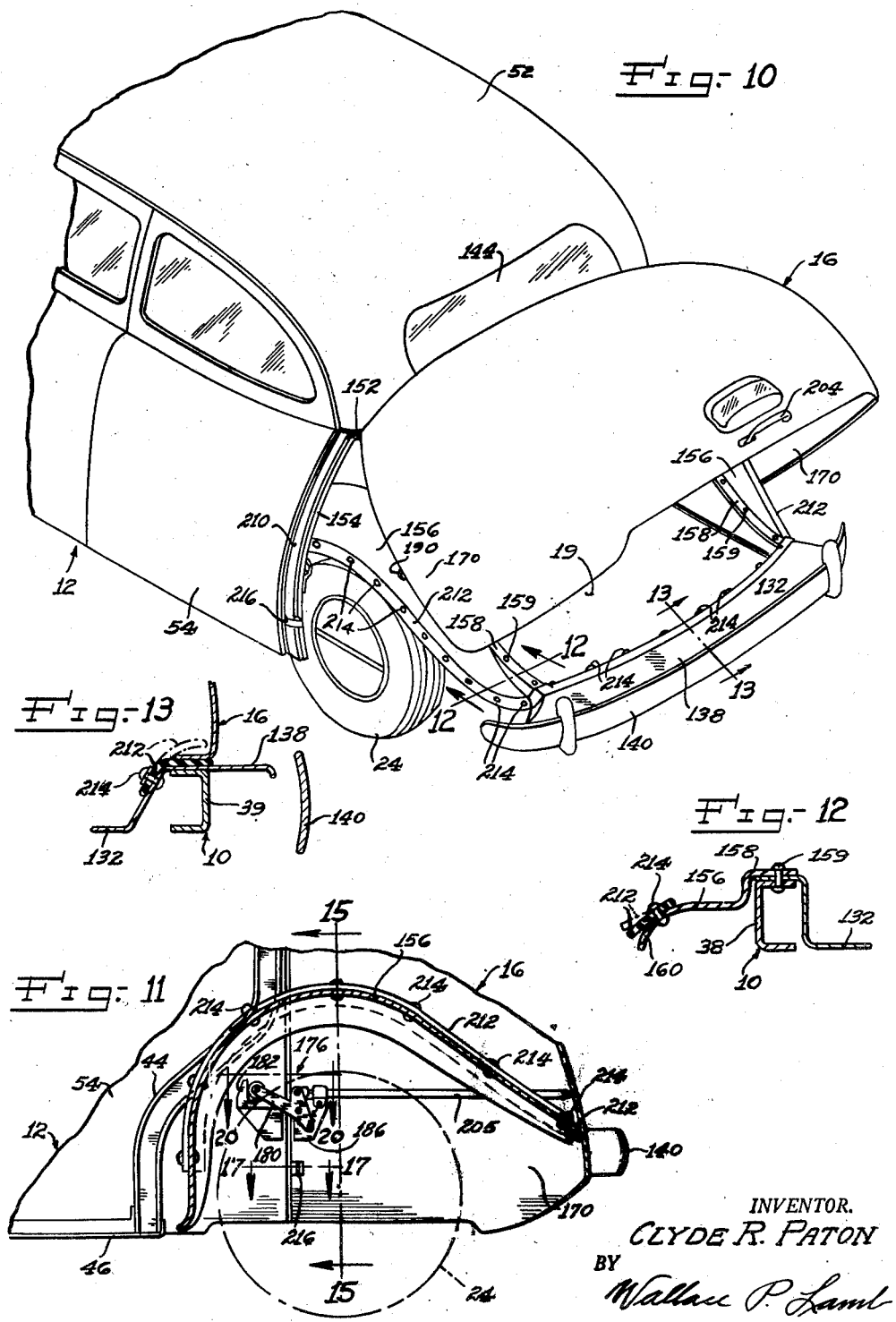

Aug. 12, 1952          C. R. PATON          2,606,625
MOTOR VEHICLE BONNET-FENDER
Filed Sept. 16, 1947          6 Sheets-Sheet 5
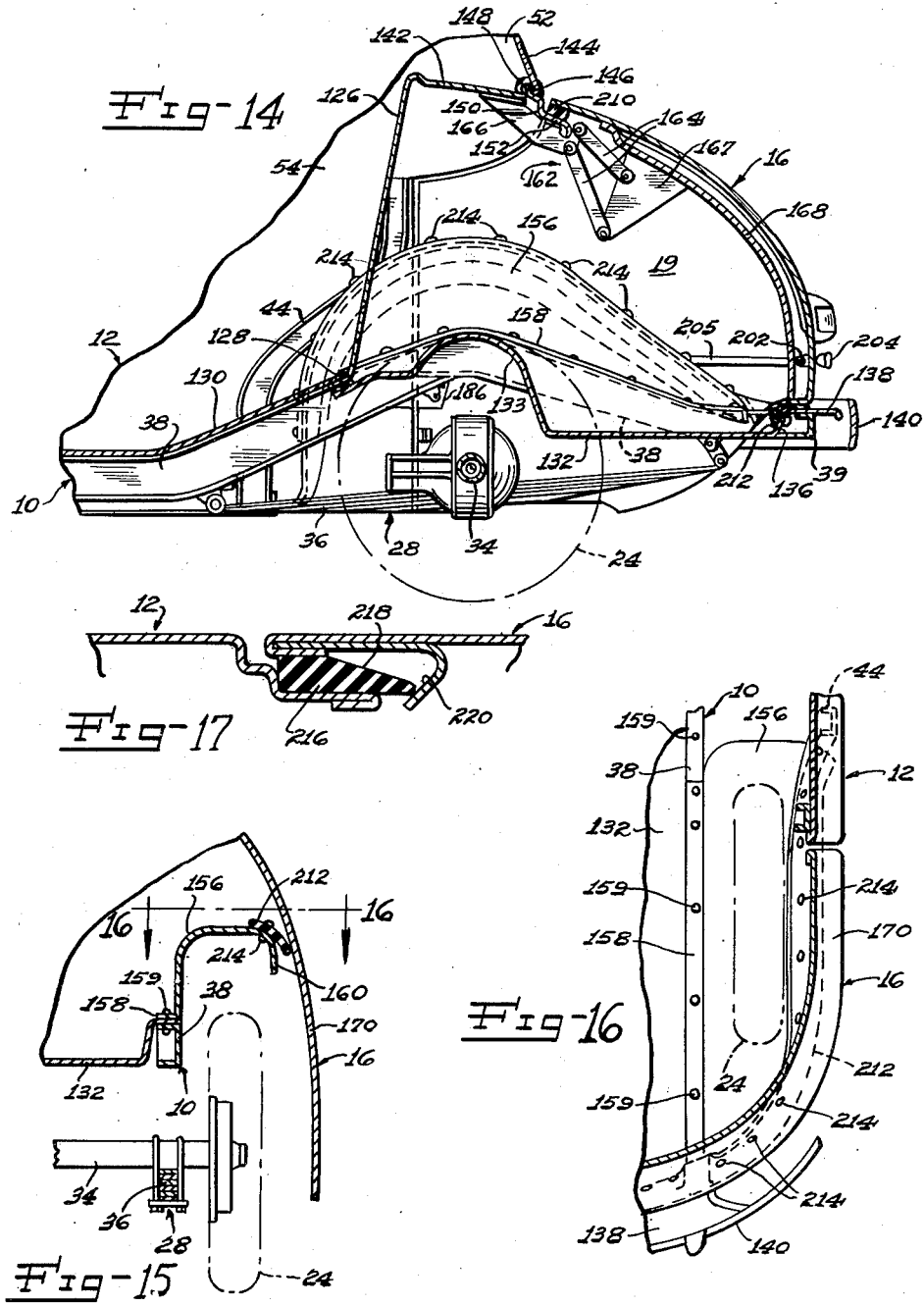
INVENTOR.
CLYDE R. PATON.
BY
Wallace P. Lamb
ATTORNEY Aug. 12, 1952  C. R. PATON  2,606,625
MOTOR VEHICLE BONNET-FENDER
Filed Sept. 16, 1947  6 Sheets-Sheet 6

INVENTOR.
CLYDE R. PATON.
BY
Wallace P. Lamb
ATTORNEY

Patented Aug. 12, 1952

2,606,625

UNITED STATES PATENT OFFICE 2,606,625

MOTOR VEHICLE BONNET-FENDER

Clyde R. Paton, Bloomfield Village, Mich.

Application September 16, 1947, Serial No. 774,215

4 Claims. (Cl. 180—69)

This invention relates generally to motor vehicles and more particularly to bonnets therefor.

It is an object of the present invention to provide an improved motor vehicle in which the vehicle engine and associated devices are readily and openly accessible or free of objectionable, mechanic hindering obstructions upon raising of the engine compartment bonnet.

Another object of the invention is to provide an improved end panel, body extension or bonnet of a character to decrease manufacturing costs of motor vehicles.

Another object of the invention is to provide an improved relationship of body roof and body side panels with a rear end panel to decrease manufacturing costs of motor vehicles.

Another object of the invention is to provide a road wheel covering, vehicle bonnet having provisions for assuring proper fitting between the bonnet and body and for preventing bonnet rattles.

Another object of the invention is to provide an improved arrangement for supporting a motor vehicle bonnet in a manner such that movement of the chassis relative to the vehicle body will not be transmitted to the bonnet.

Another object of the invention is to provide a new and improved arrangement for supporting and latching or locking a bonnet to a motor vehicle body to prevent bonnet rattles, as well as, to prevent transmission of chassis movements to the bonnet.

Another object of the invention is to provide, in a motor vehicle having a rearwardly hinged front bonnet, against danger of accidental swinging up of the bonnet.

Another object of the invention is to attach or latch a bonnet to a motor vehicle body in a manner such that movements of the chassis frame are not imparted to the bonnet.

Another object of the invention is to provide an improved body rear end construction to eliminate certain expensive panel joining and finishing operations between the roof and rear deck panel.

Another object of the invention is to provide a motor vehicle having wheel aprons which are readily removable to give free access to the wheels.

Other objects and advantages of the invention will become apparent from the following detailed description taken in connection with the accompanying drawings in which:

Fig. 1 is a side elevational view of a motor vehicle embodying features of the present invention.

Fig. 2 is a top plan view of the vehicle of Fig. 1.

Fig. 3 is a fragmentary, perspective view of the front end of the motor vehicle.

Fig. 4 is a fragmentary, vertical sectional view of the motor vehicle, taken along the line 4—4 of Fig. 2.

Fig. 5 is a fragmentary, vertical sectional view of the motor vehicle, taken along the line 5—5 of Fig. 2.

Fig. 6 is a fragmentary, cross sectional view of the vehicle, taken along the line 6—6 of Fig. 4.

Fig. 7 is a fragmentary, horizontal sectional view of the motor vehicle taken along the line 7—7 of Fig. 6.

Fig. 8 is a fragmentary, horizontal sectional view of the motor vehicle taken along the line 8—8 of Fig. 5.

Fig. 9 is a fragmentary, vertical sectional view of the motor vehicle, taken along the line 9—9 of Fig. 5.

Fig. 10 is a fragmentary, perspective view of the rear end of my vehicle.

Fig. 11 is a fragmentary, vertical sectional view of the vehicle rear end, taken along the line 11—11 of Fig. 2.

Fig. 12 is a detail, vertical sectional view of the motor vehicle, taken along the line 12—12 of Fig. 10.

Fig. 13 is another detail, vertical sectional view of the motor vehicle, taken along the line 13—13 of Fig. 10.

Fig. 14 is a fragmentary, sectional view of the vehicle, taken substantially along the line 14—14 of Fig. 2.

Fig. 15 is a fragmentary, vertical sectional view of the vehicle, taken along the line 15—15 of Fig. 11.

Fig. 16 is a fragmentary, horizontal sectional view of the motor vehicle, taken along the line 16—16 of Fig. 15.

Fig. 17 is a fragmentary, horizontal sectional view of the motor vehicle, taken along the line 17—17 of Fig. 11.

Figure 18:
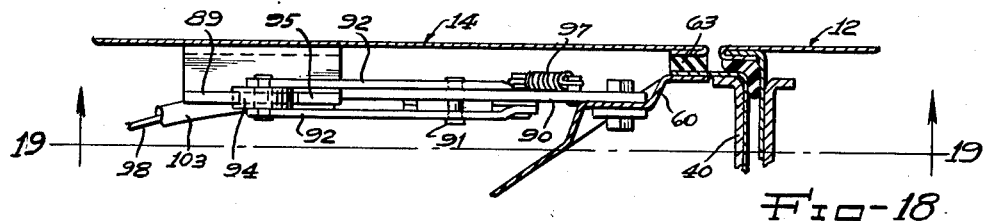
Fig. 18 is a fragmentary, horizontal sectional view of the vehicle, taken along the line 18—18 of Fig. 5.
Figure 19:
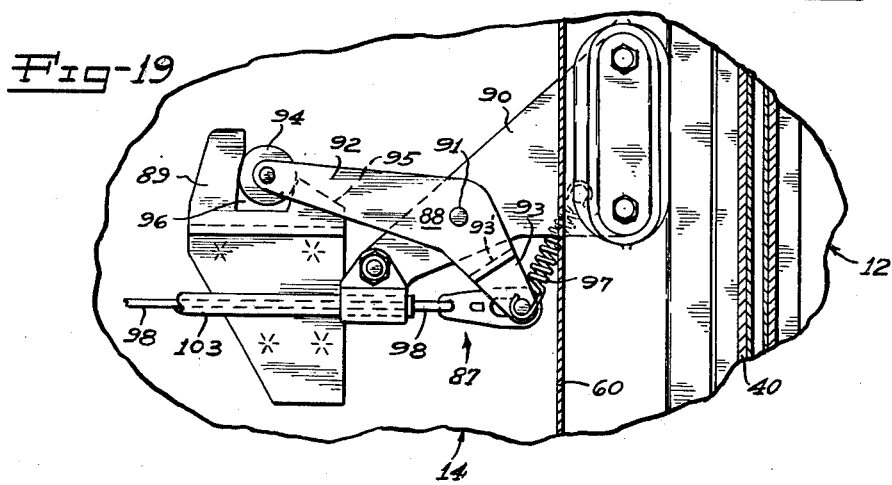
Fig. 19 is an elevational view of a bonnet latch mechanism, taken in the direction of the arrows 19—19 of Fig. 18.
Figure 20:
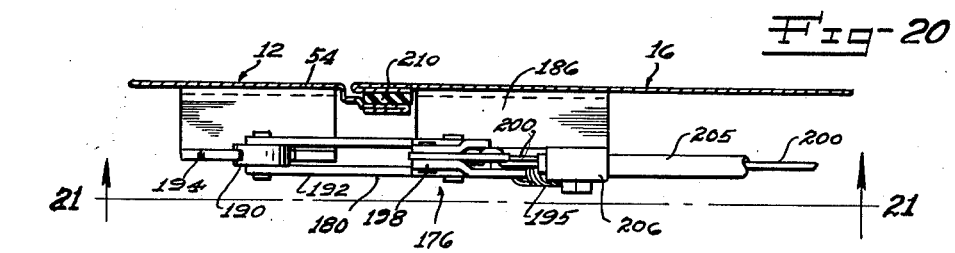
Fig. 20 is a view similar to Fig. 18 of another bonnet latch.
Figure 21:
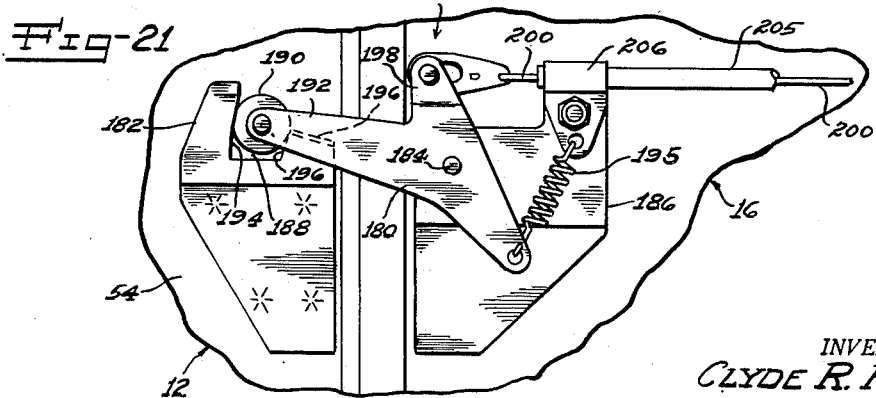
Fig. 21 is a view similar to Fig. 19 of the latch of Fig. 20.

In the drawings, there is shown a motor vehicle comprising, in general, a supporting member or chassis frame 10, a body 12, a body front end extension or bonnet 14 and a body rear end extension or bonnet 16. Among other units of the vehicle, the chassis frame 10 supports the body 12 and vehicle power plant engine 18. In the present arrangement of the vehicle units, the engine 18 is located in advance of the body 12, but may be located at the rear of the body, if desired. A suitable cooling system including a radiator 13 and a fan 15 may be provided in the power plant engine compartment for cooling the engine 18. The front bonnet 14 covers the engine compartment and the rear bonnet 16 covers a rear luggage compartment 19. These bonnets 14 and 16 are hinged to the body 12 and, as will later be seen, are supported substantially solely by the body so that slight movements of the chassis frame 10 relative to the body, due to uneven road surfaces will not be transmitted to the bonnets 14 and 16.

The chassis frame 10 is supported by the usual front and rear ground wheels 22 and 24 respectively which are connected to the frame by front and rear wheel suspension devices 26 and 28 respectively. Any suitable type of wheel suspension device may be used. In the present instance, the front wheels 22 are connected to the frame 10 by links 30 which may be connected together by a transversely extending elliptical spring 32. At the rear end of the vehicle, a rear wheel axle housing 34 may be suspended from the frame 10 by longitudinally extending elliptical springs 36. The frame 10 may be of the substantially rigid type which extend from front to rear of the vehicle, or may be of any other suitable type. As shown, the frame 10 comprises a pair of laterally spaced, side frame members 38 and transverse, connecting frame members 39. These frame members 38, 39 may be welded or may be otherwise suitably secured together.

The body 12 comprises, in general, a framework preferably of metal including opposite, front side pillars 40, opposite, side center pillars 42 and opposite, rear side pillars 44. These pillars 40, 42 and 44 rigidly connect sills 46 and roof rails 48 together. Doors 50 may be hinged to the front pillars 40. The external body paneling includes a roof panel 52 and rear quarter panels 54. If desired, the rear quarter panels 54 may be replaced by rear doors (not shown). At the front of the body 12 is the usual windshield 56, dash panel 58 and cowl 60. The above pillars, panels, etc., together with the body floor or underbody structure cooperate in the construction of what may be termed the body proper; the front bonnet 14 and the rear bonnet 16 being removable extensions thereof. In order to reduce costs of manufacturing motor vehicles, I terminate the body sides at the forward edges of the doors 50 and at the rear edges of the quarter panels 54. The cowl 60 is provided with an inwardly offset, bonnet receiving ledge 61 which extends across the cowl and down the sides, adjacent the front edge of the doors 50. As shown, the bonnet 14 when in closed position overlaps the cowl ledge completely concealing the cowl and its ledge. Extending along the cowl ledge 61 is a strip of antisqueak which may be attached to the cowl ledge 61 by rivets or by other suitable securing means.

Adjacent its rear edge, the front bonnet 14 is hinged to the body cowl 60 by a hinge 62 which may be of any suitable type, and may be located substantially midway between the sides of the bonnet 14. This hinge 62 may comprise upper and lower pairs of spaced links 64. Rear ends of the hinge links 64 may be attached by pivot pins 65 to a bracket 66 which may be secured to the body dash 58 and front ends of the hinge links may be attached by pivot pins 67 respectively to laterally spaced brackets 68, secured to the bonnet 14. The brackets 68 may be welded or may be otherwise suitably secured to a longitudinally extending bonnet reinforcing member 70 which may be welded adjacent its opposite ends to the underside of the bonnet. As shown, the bonnet reinforcement 70, may be an elongated member of channel-like cross section extending centrally and longitudinally of the bonnet.

In order to decrease further the manufacturing cost of motor vehicles, I make the bonnet 14 of one piece comprising, a central, engine compartment cover 71, intermediate, opposite side fender portions 72 and opposite outer side apron portions 73. By providing a bonnet comprising integral front wheel fenders 72, central section 71 and aprons 73 a considerable saving in manufacturing and assembling cost is effected since much tool, die and assembly costs are eliminated. For example, when my bonnet-fender panel 14 is assembled to the body 12, the sheet metal of the front end of the vehicle is substantially completed in this one assembly operation. Another advantage of this bonnet-fender panel 14 is that the fenders 72 being an integral part of the bonnet are, in effect, hinged fenders which may be swung up out of the way giving substantially unobstructed and ready access to the engine 18 and to the front wheels 22, as illustrated in Fig. 3. In lowered position of the bonnet-fender panel 14, the fenders 72 overlie the vehicle front wheels; outer side fender aprons 73 being provided with openings 74 for steering clearance with the front, steerable ground wheels 22.

Respectively overlying the front ground wheels 22 are fixed, splash guards or inner fenders 76 which among other functions, shield the engine 18 from water splashed by the wheels 22 and shield the bonnet-fender panel 14 against damage from stones thrown by the wheels. These splash guards 76 have inwardly disposed aprons 77 which are flanged along their lower edges, as at 78, to seat on and for attachment to the chassis frame side members 38 between the wheels 22 and the engine compartment. Rivets 80 or other suitable attaching means may be used to secure the splash guard seating flanges 78 to the upper flanges of the frame side members 38. Preferably, the aprons 77 of the splash guards 76 are provided with one or more vertically extending reinforcing ribs 82. The splash guards 76 extend respectively over the front wheels 22 having outer, downturned reinforcing side flanges. Between each of the splash guards 76 and the adjacent fender 72, I provide a seal 84 to flexibly seal the joints formed between the fenders and splash guards against entrance of water to the engine compartment. These seals 84 may be rubber, rubberized fabric, felt or any other suitable sealing material which is displaceable or flexible so that slight movements of the chassis front end will not be transmitted to the bonnet-fender panel 14. In the present instance, the seals 84, in strip form are attached to the splash guards 76, extending along and adjacent the outer, rounded surfaces of the guards 76, but, if desired, the seals may be carried by the bonnet-fenders. Rivets 86 or other suitable attaching means may be used to secure the seals 84 to the splash guards 76. The present seals 84 are attached to the splash guards 76, adjacent the inner edges of the seals which flex upwardly and outwardly away from the adjacent rounded surfaces of the fenders when the bonnet is raised. When the bonnet-fender panel 14 is lowered, the seals 84 are engaged thereby adjacent their outer edges and are flexed slightly downwardly to form splash tight joints with the bonnet fenders. At this point, it is emphasized that the bonnet-fender panel 14 fits down over the splash guards concealing them, but is not appreciably supported by the splash guards 76. Also, the bonnet-fender panel 14 is neither in contact with nor attached to the chassis frame 10, but instead is carried substantially solely by the body 12 except for the slight force transmitted to the splash guards through flexing of the sealing members by the bonnet.

The bonnet-fender panel 14 is held down to the body cowl 60, in spaced relation to the splash guards 76 by supporting members or a pair of lock or latch members, designated generally by the numeral 87. These latch mechanisms 87 each may comprise, in general, a pivoted latch member or lever 88 and a keeper 89. The levers 88 of the latch mechanisms are mounted on opposite sides of the body cowl 60, below the hinge 62 and adjacent the body front pillars 40. The latch keepers 89 are carried by the bonnet 14 and may be welded or may be otherwise suitably secured thereto. Carried by and extending forwardly of the body cowl 60 on each side thereof is a bracket 90 on which the latch levers 88 are respectively pivoted by pivot pins 91. The latch levers 88 are pivoted intermediate their ends, each having a forwardly extending arm 92 and a rearwardly and downwardly extending arm 93. On the forward ends of each of the levers 88 is carried a roller 94 which is adapted to ride up an inclined or cam surface 95 of the keeper 89 and engage in the keeper socket or notch 96 when the bonnet-fender panel 14 is lowered. These notches 96 are slightly tapered downwardly and inwardly to effect a wedging action with the rollers 94 so as to hold the bonnet in spaced relation to the splash guards and for the further purpose of preventing rattling of the latch parts. Each of the latch levers 88 is provided with a helical coil spring 97 arranged to pivot the levers 88 in direction to urge the lever carried rollers 94 into the keeper notches 96. Offsets 93' in the latch lever arms 93 provide stops for the levers so that the rollers 94 will be in proper position to engage the inclined cam surfaces 95 of the keepers when the bonnet is lowered. The springs 97 may have lower ends thereof respectively attached to the lever arms 93 and may have their other or upper ends attached to the bracket 90 above and rearwardly of the levers. Also attached to the lower arms 93 of the latch levers 88 are ends of latch operating pull wires 98 having their opposite ends attached to a lever 97 pivoted to a bracket 99 which is secured to the dash panel 58. The lever 97 is operated by a handle 100 on the instrument panel 102 of the vehicle, thus providing a remote releasing means operable to release simultaneously both of the bonnet latch mechanisms. The wires 98 may be guided in a tube 103 which may be attached by spaced clamps 104 to the body cowl and to the ends of the bracket 90. It should be understood that other suitable forms of self engaging rattle resistant latches may be used.

Below the latch mechanism 87 on each side of the cowl 60, I provide a bonnet guide member 106 to insure proper alignment of the bonnet with the forward edges of the doors 50. These guide members 106 may be made of a suitable anti-squeak and somewhat yieldable material, such as rubber. These rubber guide members 106 may be secured by screws or by any other suitable securing means to the outer side surfaces of the ledge of the cowl 60. Each of the bonnet guide members 106 is formed with a forwardly and outwardly facing, inclined cam surface 108 which is arranged to be engaged by the rear, rounded edge of the bonnet 14 to guide or urge the bonnet outwardly for proper alignment respectively with the forward edges of the adjacent body panel or door 50. The bonnet 14 has a reversely bent marginal portion 110 extending along and reinforcing the rear bonnet edge. Clamped between the bonnet proper and the reversely bent marginal edge portion 110 thereof is a cam guide 112 for the bonnet. This guide 112 may be inexpensively made of sheet metal. A forward end portion of the guide 112 is reversely bent back in spaced relation and at an angle to provide a cam surface portion 114 extending inwardly and rearwardly. This cam portion 114 of the guide member 112 is adapted to engage inwardly behind a forwardly extending portion 116 of the rubber guide 106 to draw the sides of the bonnet 14 inwardly to the cowl sides to maintain proper alignment with the front edges of the doors 50. The guides 106 also serve to prevent rattles between the bonnet 14 and the body cowl 60.

In order to provide against the danger of the bonnet 14 swinging up accidentally when the vehicle is in motion, I provide a safety stop 116 which is normally biased to locked position and cannot be released from within the body. With particular reference to Fig. 5 of the drawings, the safety stop 116 is located adjacent the front of the bonnet 14 preferably centrally thereof. This safety stop 116 comprises a stop arm 118 having a lower end pivoted to a bracket 120 which is secured to the frame cross member 39. A tensioned helical coil spring 122 urges the stop arm 118 forwardly against the bracket 120 as a stop, in which position the stop arm extends upwardly from its pivot, as shown. The upper end of the stop arm 118 extends forwardly overlying an inturned abutment 124 of the bonnet reinforcement 70 to engage therewith if, for any reason the bonnet 14 should become unlatched and start to swing upwardly. As shown, when the bonnet 14 is latched down, the upper end of the safety stop arm 118 is vertically spaced from the bonnet reinforcement abutment 124 so that there will be no transmission of chassis frame movement to the bonnet 14. After unlatching the bonnet 14 by turning the instrument board control lever or handle 100, the safety stop arm 118 will have to be moved out of the way of abutment 124 before the bonnet 14 can be raised. This may be done by reaching through the bumper bars and pressing the safety stop arm 118 back until the abutment 124 clears the upper end of the safety stop. The upper forward edge of the stop arm 118 and the lower rear edge of the abutment 124 may have rounded, engageable cam surfaces 125 so that when the bonnet 14 is lowered, the safety stop arm 118 will be engaged and swung back slightly by the abutment 124, permitting the abutment 124 to pass thereby after which, of course, the spring 122 will act to return the safety stop arm 118 to its effective position immediately above abutment 124. Thus, it will be seen that I have provided remotely controlled latches and a safety stop for a bonnet-fender panel which is carried solely by the body so that movements of the chassis frame relative to the body will not be transmitted to the bonnet-fender panel. It will be seen that in latched position of the bonnet 14, the centers of the rollers 94 are slightly above the centers of the latch lever pivots 91 with the result that the force of the weight of the bonnet is directed rearwardly through said centers toward the body dash. Thus, the latch mechanisms serve as stops for the bonnet, holding the same in vertical spaced relation to the splash guards, a distance sufficient to engage and flex the seals 84 but insufficient to exert any appreciable weight on the splash guards. This allows movement of the splash guards with the chassis frame, relative to the bonnet, thus preventing transmission of at least slight movements of the chassis frame to the bonnet.

Referring now to the rear end construction of my motor vehicle, the body 12 may have an inner, transverse partition 126, common to the luggage compartment 19 and to the passenger compartment. Along its lower edge, the partition 126 may be provided with a forwardly turned flange 128 which may overlap and be welded or be otherwise suitably secured to a body floor pan 130. A luggage compartment floor pan 132 extends from the partition 126 to the frame rear cross member 39 and extends transversely between the frame side members 38. As shown, the floor pan 132 is provided with the usual, upwardly directed offset 133 for clearance with the rear axle housing. Interposed between the partition flange 128 and the luggage compartment floor pan 132 is a seal and anti-squeak strip of material 134 which may be rubber, rubberized fabric, felt or any other suitable material. At its rear edge, the luggage compartment floor pan 132 is offset upwardly, as at 136, to seat on the frame rear cross member 39 to which the floor pan may be welded or be otherwise suitably secured. To effect a saving in manufacturing and assembly costs and generally to improve vehicle construction, I extend the luggage compartment floor pan 132 rearwardly and externally of the luggage compartment to provide a rear splash or stone shield 138 between the body and rear bumper bar 140. By this arrangement, a saving is effected by eliminating the cost of making and assembling a separate, rear stone shield for the vehicle.

Extending upwardly from the floor pan 130, the partition 126 turns rearwardly to join the body roof panel 52 and form a shelf 142. In the roof panel 52, above the shelf 142, a rear window glass 144 is held in place by a channel retainer 146 which may be made of rubber. This rubber retainer 146 may also be formed to receive and retain an upturned rear flange 148 of the shelf 142, as shown in Fig. 14. Below the rear window 144, the roof panel 52 is provided with a rearwardly directed cowl 150 terminating in a downwardly offset, bonnet receiving ledge 152. This cowl and its ledge 152 extend along the lower rear edge of the roof panel, terminating at the rear edges of the opposite side quarter panels 54. Similarly, inwardly offset ledges 154 formed on the rear edges of the quarter panels 54 reinforce or stiffen these panels and provide seating surfaces for forming flush joints with the rear side edges of the bonnet 16. As shown, the bonnet receiving ledges 154 extend downwardly from the cowl bonnet ledge 152, preferably to the lower edges of the quarter panels. The bonnet 16 has upper and side edges shaped to fit complementary and flush with the ledges 152, 154 to form a good separable joint therewith. This construction entails a saving in manufacturing costs over former constructions in which it was necessary to join rear quarter panels and rear deck panels, usually by solder; an expensive operation made further expensive by the need to finish the joints so as to conceal them.

Overlying each of the rear wheels 24, beneath the bonnet 16 is a splash guard or inner fender 156 forming wheel housings. The splash guards 156 may be made of sheet metal, plastic or other suitable material each having an inturned longitudinally extending flange 158 along the bottom edge thereof for seating on and for attachment to the frame side members 38. The luggage compartment floor pan 132 may seat on the frame side members between the upper surface of these members 38 and the splash guard flanges 158; and rivets 159 or other suitable securing means may be used to secure the parts together (see Fig. 15). Extending upwardly from the frame 10, the splash guards 156 respectively extend over the rear wheels 24, having each an outer downturned side flange 160 respectively positioned slightly outwardly of the wheels 24.

The bonnet 16 is attached to the body 12 by a hinge 162 which may be located substantially midway of the bonnet sides. The hinge 162 is similar to the front body hinge having pairs of links 164 pivotally connected to brackets 166 and 167 which may be respectively secured to the body 12 and to the bonnet 16. The bonnet bracket 167 is preferably welded to a bonnet reinforcing member 168 which is secured to the underside of the bonnet 16. The bracket 166 may be welded or may be otherwise suitably secured to the body structure such as the underside of the partition shelf 142.

The bonnet 16, a single panel, forms substantially the entire outer sheet metal of the vehicle rear end, serving the function of luggage compartment cover and rear side panels or fenders 170. The fenders 170 extend downwardly and outwardly of the rear wheels 24 to provide aprons or wheel shields, but may be swung up to gain ready access to the wheels when, for example, it becomes necessary to replace a wheel or if any other reason access to the wheels 24 is desired. In closed position, the bonnet 16 overhangs and conceals the splash shield 156, but is not supported by the spash shields. Like the front bonnet 14, the rear bonnet 16 is carried solely by the body 12 in a manner such that rear end vertical and twisting or oscillatory movements or deflections of the frame 10 will not be transmitted to the bonnet. To this end, the bonnet 16 is supported on the body 12 by the hinges 162 and by a pair of laterally positioned locks or latching devices each of which is designated generally by the numeral 176. The latch devices 176 are preferably disposed on opposite sides of the vehicle, inwardly of the rear quarter panels 54 and of the bonnet 16.

The latch devices 176 each may comprise, in general, a latch lever member 180 and latch keeper member 182. The latch lever 180 may be pivoted as at 184, to a bracket 186 which may be secured, such as by welding to the inner side of the bonnet 16, adjacent the rear edge thereof. The keepers 182 may be welded to the inner sides of the rear quarter panels 54, adjacent the rear edges thereof. Each of the keepers 182 has an upwardly facing slot or socket 188 to receive a roller 190 carried by and on a forwardly extending arm 192 of the latch lever 180. The keeper socket 188 has opposed front and rear surfaces 194 and 196 respectively which are engaged by the roller 190 in wedging relation. When the latch rollers 190 are engaged in the keeper sockets 188, the rollers 190 are slightly above the pivots of the levers 180 so that the weight of the bonnet 16 has a component of force acting through the lever pivot 184 and roller pivots against the face 194 of the keeper socket 188. Thus, it will be seen that the latch devices 176 act to limit closing movement of the bonnet 16, as well as, act to latch releasably the bonnet against swinging upwardly, whereby the bonnet is carried solely by the body 12. Each of the latch levers 180 is urged toward latched position by a helical coil spring 195 which acts through the levers 180 to urge the rollers 190 into the keeper sockets 188. Inclined cam surfaces 196 on the keeper members 182 are provided for the latch rollers 190 adjacent the sockets 188. Each of the latch levers 180 is further provided with an arm 198 to which ends of release wires 200 are secured; the other ends of the wires 200 being secured to an inner lever arm 202 of an external lockable operating handle 204 which is rotatably mounted in and to the bonnet substantially midway between the sides thereof. The wires 200 may be guided in tubing 205 which may be attached to the inner surface of the bonnet by suitable clips 206.

In order to prevent entrance of water and dust into the luggage compartment 19, I provide sealing members or gaskets 210 and 212 to seal the compartment when the bonnet 16 is closed. The seal 210 may be a strip of a suitably displaceable material, such as rubber, fabric or felt. This seal may extend along the roof panel cowl ledge 152 and the ledges 154 of the opposite rear quarter panels thus also preventing metal contact or serving as anti-squeak at the bonnet-body separable joints. The anti-squeak seal 210 may be secured by rivets or by other suitable means to and at spaced intervals along the panel ledges 152, 154. The other seal 212 extends along the outer rounded surfaces of the splash guards 156 and across the luggage compartment floor pan 132 in position for contact with the bonnet. To form a substantially continuous dust and watertight joint, without having any appreciable support of the bonnet 16 on the splash guards, I make the seal 212 of a resilient or flexible material, preferably rubber strip stock, and arrange the seal so that it will be flexed longitudinally by engagement with the bonnet. As illustrated in Fig. 15, the seal may be attached to the outer rounded surfaces of the splash guards and project outwardly beyond the splash guards in position to be engaged and flexed downwardly by the bonnet 16 when the bonnet is lowered. Rivets 214 or other suitable attaching means may be used to attach the seal 212 to the splash guards 156; the rivets being arranged adjacent the inner edges of the sealing strips where they will not be engaged by the bonnet and where they will allow the sealing strip to flex upwardly. Following along the outer surfaces of the splash guards 156, the seal 212 twists adjacent the rear ends of the splash guards and following the offsets over the frame sides extends across the floor pan 132 above the frame rear cross member 39. As shown in Fig. 13, the sealing strip 212 may be attached adjacent its inner edge to the floor pan 132 by rivets 214. Optionally, sealing members may be otherwise located and arranged to secure a complete closure for the luggage compartment when the rear bonnet is in the closed position.

To the ledge of each of the quarter panels, I secure a guide member 216 to insure proper flush alignment of the bonnet 16 with the quarter panels. The seals 210 may be interrupted at the locations of the guides 216 which may be made of rubber, as indicated in Fig. 17. These guide members 216 have outwardly facing cam curfaces 218 extending forwardly and outwardly so that when they are engaged by the rounded turned edges of the bonnet 16, the bonnet side or sides will be forced outwardly to match or align with the quarter panels 54. Carried by and clamped to the bonnet 16 by the bent back edge flanges thereof are cam members having cam surfaces 220 adapted to engage rear edges of the guide members 216 to urge the sides of the bonnet inwardly when necessary so as to obtain desired flush alignment with the rear edges of the quarter panels 54.

From the foregoing description, it will be noted that I have provided an improved motor vehicle of reduced weight and reduced cost of manufacture. A saving in cost and weight is effected by my provision of a front bonnet which comprises a central portion, and integral fenders extending to the front edges of the door panels whereby to eliminate the making of separate fenders, cowl panel, hood, etc. Similarly, a reduction of cost and weight is effected by the provision of a body rear extension or bonnet consisting of a rear deck cover portion, integral fenders, etc. eliminating the making and assembling of several panels. Also, I have provided inexpensive front and rear inner splashers or fenders, independent of the body and have provided for sealing the joints between splash guards and bonnet. In addition, the bonnets are carried solely by the body whereby movement of the splash guards with the frame ends will not be transmitted to the bonnets.

Although a preferred form of the invention has been illustrated and described in detail, it will be apparent to those skilled in the art that various modifications may be made therein without departing from the spirit of the invention or from the scope of the appended claims.

I claim:

1. In a motor vehicle, supporting means, a pair of oppositely disposed ground wheels attached to said supporting means, a body carried by said supporting means, a pair of splash guard members carried by said supporting means separate from said body and extending respectively inwardly of said pair of wheels, sealing members carried by and extending along the outer edges of said splash guards, a bonnet hinged to and supported solely by said body overlying and substantially covering said pair of splash guard members and said sealing members, said bonnet having a closed position engaging said sealing members without application of bonnet weight on said splash guard members, and cooperable stop means on said bonnet and on said body limiting said bonnet to said position so that said splash guards may move relative to said bonnet against said sealing members.

2. In a motor vehicle, supporting means, a ground wheel attached to said supporting means, a body carried by said supporting means, a splash guard carried by said supporting means inwardly of said ground wheel, a bonnet hinged to said body overlying and enclosing said splash guard, said bonnet being spaced from said splash guard so that movements of said supporting means will not be transmitted to the bonnet, displaceable sealing means interposed between said bonnet and said splash guard and being displaceable by and when said bonnet is lowered, and latch means on said bonnet and on said body holding said bonnet spaced from said splash guard.

3. In a motor vehicle, supporting means, a body carried by said supporting means, resilient suspension means connecting said supporting means and said body together for relative movement therebetween, a wheel splash guard member carried by said supporting means movable therewith relative to said body, a bonnet hinged to said body and overlying said splash guard, cooperable stop means on said bonnet and on said body spacing said bonnet from said splash guard, and resilient sealing means closing and sealing the space between said bonnet and said splash guard, said sealing means being displaceable by said bonnet and being limited in said displacement by said stop means.

4. In a motor vehicle, a frame, a body, means connecting said frame and body together for relative transverse oscillatory movement therebetween, a bonnet hinged to said body, a splash guard carried solely by said frame and movable therewith relative to said bonnet, a fender carried by said bonnet overlying said splash guard and movable with the bonnet relative to the splash guard, said splash guard having a crown on the outer edge thereof, a flexible sealing strip attached to said crown extending outwardly from said splash guard for engagement and limited flexing by said fender, and bonnet latching means on said body and bonnet limiting flexing of said sealing member and spacing said bonnet from said splash guard.

CLYDE R. PATON.

REFERENCES CITED

The following references are of record in the file of this patent:

UNITED STATES PATENTS

| Number | Name | Date |
|---|---|---|
| D. 96,860 | Ryan | Sept. 10, 1935 |
| 2,010,350 | Davis | Aug. 6, 1935 |
| 2,086,172 | Northup | July 6, 1937 |
| 2,125,761 | Westrope et al. | Aug. 2, 1938 |
| 2,127,321 | Barnett | Aug. 16, 1938 |
| 2,157,793 | Lang | May 3, 1939 |
| 2,175,528 | Klavik | Oct. 10, 1939 |
| 2,199,315 | Klavik | Apr. 30, 1940 |
| 2,215,606 | Dunn | Sept. 24, 1940 |
| 2,232,275 | Ronning | Feb. 18, 1941 |
| 2,286,582 | Sherman | June 16, 1942 |
| 2,333,173 | Gunning | Nov. 2, 1943 |
| 2,349,940 | Craig | May 30, 1944 |
| 2,413,792 | Sharp | Jan. 7, 1947 |
| 2,474,992 | Stephenson et al. | July 5, 1949 |

FOREIGN PATENTS

| Number | Country | Date |
|---|---|---|
| 476,100 | Great Britain | Dec. 1, 1937 |
| 500,102 | Great Britain | Feb. 2, 1939 |
| 738,686 | France | Oct. 18, 1932 |

OTHER REFERENCES

Darrin Car, "Auto-car" of September 13, 1946, pages 798–799.

Bignan Sport Car, "Automotive Industries," April 24, 1924, pages 911, 310.